United States Patent [19]

Bradley

[11] Patent Number: 4,870,943
[45] Date of Patent: Oct. 3, 1989

[54] THERMAL LIQUID PUMP

[76] Inventor: Curtis E. Bradley, 4517 Calle Ventura, Phoenix, Ariz. 85018

[21] Appl. No.: 258,047

[22] Filed: Oct. 14, 1988

Related U.S. Application Data

[63] Continuation of Ser. No. 881,004, Jul. 1, 1986, abandoned.

[51] Int. Cl.⁴ .............................................. F02M 31/12
[52] U.S. Cl. ..................................... 123/558; 123/472
[58] Field of Search ............... 123/557, 558, 557, 472, 123/467, 305, 458, 549; 417/505, 207

[56] References Cited

U.S. PATENT DOCUMENTS

| | | | |
|---|---|---|---|
| 904,203 | 11/1908 | Hertzberg et al. | 123/557 |
| 1,694,911 | 12/1928 | Dienner | 417/207 |
| 1,712,492 | 5/1929 | Dienner | 417/207 X |
| 2,061,014 | 11/1936 | Wade | 417/207 X |
| 2,108,706 | 2/1938 | Crillon | 123/193 H |
| 2,482,864 | 9/1949 | Nemnich | 123/557 |
| 2,785,638 | 3/1957 | Moller | 417/505 |
| 3,361,353 | 1/1968 | Millman | 123/558 |
| 3,648,669 | 3/1972 | Rank | 123/558 |
| 3,762,378 | 10/1973 | Bitonti | 123/122 E |
| 3,819,305 | 6/1974 | Klochemann et al. | 417/505 X |
| 3,868,939 | 3/1975 | Friese et al. | 123/122 A |
| 3,893,428 | 7/1975 | Markus | 123/558 X |
| 3,945,352 | 3/1976 | Reimuller | 123/34 A |
| 3,969,605 | 7/1976 | Danell | 417/207 X |
| 4,083,340 | 4/1978 | Furr et al. | 123/558 |
| 4,126,111 | 11/1978 | Hafnes et al. | 123/557 X |
| 4,137,872 | 2/1979 | Loflin | 123/34 A |
| 4,177,778 | 12/1979 | Naitou et al. | 123/122 F |
| 4,201,167 | 5/1980 | Bayley | 123/122 E |
| 4,206,733 | 6/1980 | Gregory | 123/557 |
| 4,284,043 | 8/1981 | Happel | 123/557 |
| 4,342,300 | 8/1982 | Matthes | 123/557 |
| 4,344,743 | 8/1982 | Bessman et al. | 417/505 X |
| 4,372,278 | 2/1983 | Smith | 123/557 |
| 4,401,091 | 8/1983 | Costello et al. | 123/557 |
| 4,458,655 | 7/1984 | Oza | 123/557 |
| 4,566,416 | 1/1986 | Berchtold | 123/458 |
| 4,583,512 | 4/1986 | Gardner et al. | 123/558 X |
| 4,636,150 | 1/1987 | Falk et al. | 417/505 X |
| 4,642,034 | 2/1987 | Terauchi | 417/310 X |
| 4,669,433 | 6/1987 | Hoppie et al. | 123/558 X |

FOREIGN PATENT DOCUMENTS

| | | | |
|---|---|---|---|
| 2646069 | 4/1978 | Fed. Rep. of Germany | 123/557 |
| 2800894 | 7/1979 | Fed. Rep. of Germany | 123/557 |
| 0035272 | 3/1983 | Japan | 123/557 |
| 0043165 | 3/1985 | Japan | 123/472 |
| 86/02978 | 5/1985 | PCT Int'l Appl. | 123/558 |
| 1138532 | 2/1989 | U.S.S.R. | 123/558 |

Primary Examiner—Willis R. Wolfe
Assistant Examiner—M. Macy
Attorney, Agent, or Firm—Cahill, Sutton & Thomas

[57] ABSTRACT

A thermal liquid pump suitable for use as a fuel injector is described; when used as a fuel injector hypergolic combustion is possible. The pump includes a space or chamber that is connected to a fuel supply source. A check valve admits the fuel from the fuel supply into the chamber wherein an electrical heating coil heats the fluid within the chamber. The fuel confined in the chamber is not permitted to vaporize and the increasing temperature creates increasing pressure through thermal expansion of the fuel. A delivery valve is provided in the chamber that is electrically actuated to open and discharge the pressurized fuel into a combustion space. When an appropriate amount of fuel has been discharged, the delivery valve is closed and additional fuel is admitted to the chamber through the check valve.

6 Claims, 1 Drawing Sheet

U.S. Patent  Oct. 3, 1989  4,870,943
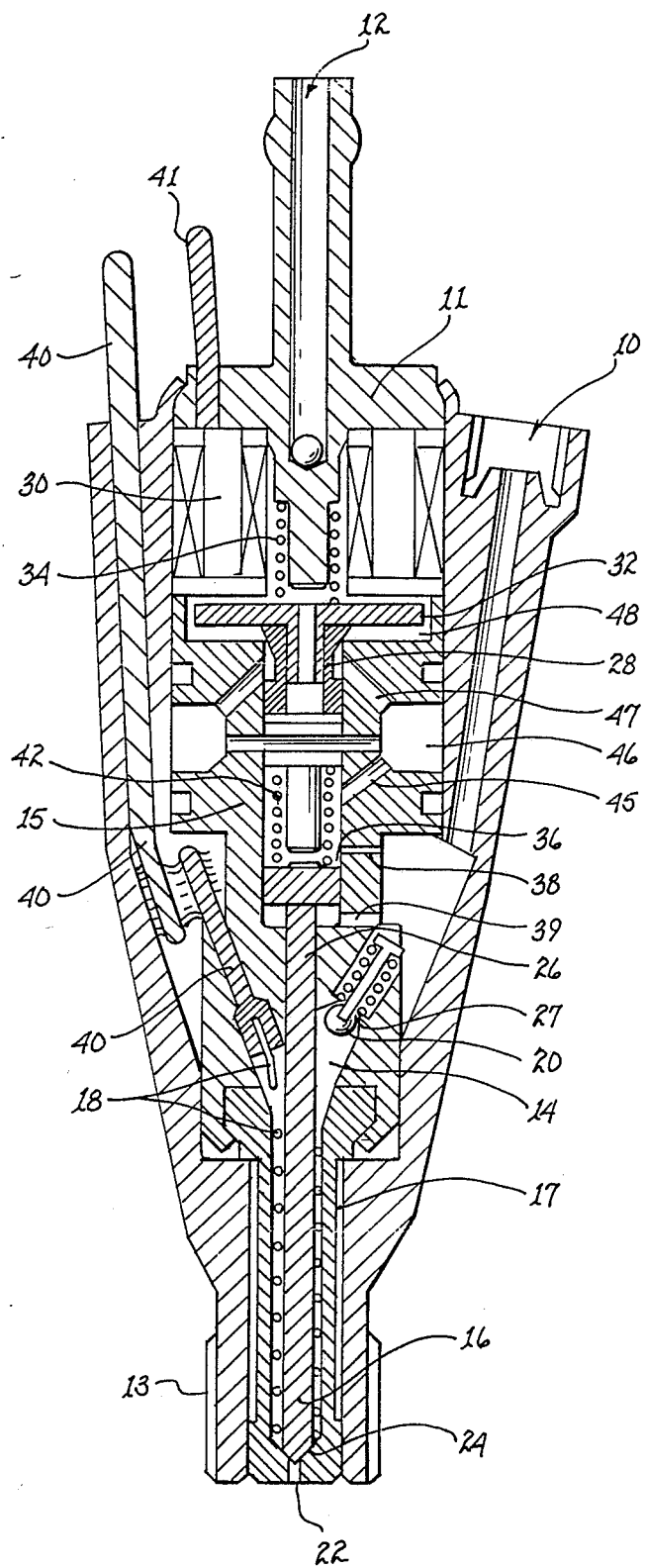

THERMAL LIQUID PUMP

This is a continuation of application Ser. No. 06/881,004, filed July 1, 1986 now abandoned.

FIELD OF THE INVENTION

The present invention pertains to liquid pumps, and more particularly to thermal liquid pumps that may be useful in fuel injection applications.

BACKGROUND

Liquid pumps have taken a variety of forms and have incorporated a variety of techniques for pressurizing liquid for transport. In those applications where very high pressures may be found useful, such as fuel injectors where the liquid is to be discharged into a combustion space, several unique difficulties present themselves. In such fuel injection environments, the liquid being transported by the injector is a hydrocarbon fuel.

One characteristic possessed by hydrocarbon fuels is that under the correct conditions of temperature, pressure, and air mixture the fuels will self-ignite. In diesel engines the fuel is ignited due to the high temperature of the compressed air in the vicinity of the injected fuel which causes the fuel, after a small time delay, to ignite in the hot air present. It is also possible to heat the fuel prior to injection into an air atmosphere to a temperature that will cause the fuel to spontaneously ignite, even if the air is not at an elevated temperature, that occurrence is often referred to as hypergolic ignition/-combustion.

Fuel injectors have been investigated in which the fuel was heated remotely from the injector, and research has been done which characterizes the ignition properties of hypergolic combustion. One of the characteristics of the hypergolic fuel combustion process is that the onset of combustion begins after a shorter time delay following injection than occurs when fuel is injected into a hot compressed air space.

For good efficiency the spark ignited Otto engine requires the use of fuels having a high octane, that is a fuel which does not easily ignite when a mixture of fuel and air is compressed to a high temperature. Diesel engines on the other hand must be supplied with fuels of a high cetane number, that is fuels which will easily ignite when injected into the hot compressed air in the engine cylinder. Neither fuel works well in the other type of engine. The characteristic of a hot fuel injection is that fuels of either fuel quality of high octane or high cetane can be used without regard to the compression ratio or compression temperature existing within the engine cylinder. This property of the hot fuel (hypergolic) injector makes it possible for engines to operate on multiple fuels as mixtures or separately. The hot fuel injector can be used in engines currently described as Diesel, spark ignition Otto, Brayton (gas turbines), and Rankine cycle engines. In addition to potential use in the variety of internal combustion engines, the hot fuel injector can be used in furnaces, water heaters and other places where fuel combustion is desired.

Although the conditions required for injecting of heated fuels into internal combustion engines have been investigated by numerous researchers, none have been able to configure an injector which is suitable for production in commercial engine applications.

OBJECTS OF THE INVENTION

It is therefore an object of the present invention to provide a thermal liquid pump suitable for use as a fuel injector.

It is another object of the present invention to provide a thermal pump for pumping liquids by repeatedly charging a chamber with the liquid and raising the liquid's pressure by heating.

It is another object of the present invention to provide a liquid pump incorporating a chamber for heating liquid fuel above its auto ignition temperature without permitting the liquid to vaporize and subsequently discharging the liquid from the chamber.

It is still another object of the present invention to provide a liquid pump that may be used as a fuel injector to inject fuel into a combustion space by heating the fuel prior to injection and discharging the fuel to create hypergolic combustion.

These and other objects of the present invention will become apparent to those skilled in the art as the description thereof proceeds.

SUMMARY OF THE INVENTION

In the embodiment chosen for illustration, a liquid pump in the form of a fuel injector is described incorporating a confined space or chamber that is connected to a fuel supply source. A check valve admits the fuel from the fuel supply into the chamber; an electrical heating coil heats the fluid within the chamber thus significantly increasing the pressure of the fuel. A delivery valve is provided in the chamber that is electrically actuated to open and discharge the pressurized fuel into a combustion space. When an appropriate amount of fuel has been discharged, the delivery valve is closed and a replenished supply of fuel is admitted to the chamber through the check valve.

BRIEF DESCRIPTION OF THE DRAWING

The present invention may more readily be described by reference to the accompanying drawing which is an illustration of a liquid pump in the form of a fuel injector; the injector is shown in cross-section.

DETAILED DESCRIPTION OF THE PREFERRED EMBODIMENT

Referring to the FIGURE, a housing 11 is provided with a fuel supply passage 10 adapted to be connected to a source of fuel (not shown). The supply passage 10 is connected to a chamber 14 through a check valve 20. The check valve is in the form a spring biased ball valve that will automatically open to admit fuel from the passage 10 to the chamber 14 whenever the pressure in the passage exceeds that in the chamber. Similarly, the valve will close at any time the pressure within the chamber 14 exceeds that in the supply passage 10. The chamber also includes a delivery valve 16 abutting a valve seat 24 and providing a means for the passage of the liquid within the chamber 14 through an orifice 22.

The housing 11 may be provided with a threaded end 13 for appropriately mounting the injector on an internal combustion engine. The housing also includes a central body assembly 15 that includes valve guides such as that shown at 26 and 27, and also includes flow restricting orifice 38, pressure equalizing orifice 39, and fuel return passageways 45, 46, 47, 48 all connected to the fuel return passageway 12. A solenoid 30, energized through conductor 41, is provided for opening the injection delivery valve 16 as will be described more fully hereinafter. The solenoid armature 32 is connected to and operates poppet valve 28 while return spring 34 returns the armature 32 to its position shown in the FIGURE and return spring 42 biases the injection delivery valve 16 to its closed position shown in the FIGURE.

A fuel resistance heating coil 18 positioned within the chamber 14 and is connected through conductor 40 to a suitable electrical power supply.

The operation of the injector shown in the figure may now be described. Fuel is supplied to the fuel injector under pressure; the fuel connected to the supply passage 10 must be at a pressure selected high enough to maintain inflowing fuel in a liquid condition as it flows into the chamber 14. A temperature of 1,000° F. at 1,000 psi is satisfactory for most hydrocarbon fuels. The fuel flows into the chamber 14 surrounding the injection delivery valve 16 and intimately contacts the fuel heater resistance coil 18. The supply of fuel entering the chamber passes through the check valve 20 which prevents backflow of fuel after it is heated within the chamber prior to injection.

The function of the check valve 20 and the heater 18 is to raise the temperature of the fuel to a suitable value to insure auto ignition when it is injected into the combustion space, and to increase the pressure of the initial fuel supply to a much higher value that will assist in the automization and delivery of the fuel into the intended combustion space on opening of the delivery valve 16. Thus, we are substantially increasing the pressure of the liquid so that it may be discharged into the combustion space to provide hypergolic ignition and also to increase the temperature of the fuel to a value substantially above its vaporization temperature (at atmospheric pressure) without vaporizing the fuel. The increased pressure in the confined space of the chamber due to the thermal expansion of the liquid may be described as thermal pumping, thus eliminating the need for high pressure mechanical pump techniques. The pressure rise is selected by controlling the temperature. Pressures up to 30,000 psi can be generated which correspond to the highest levels used in the most demanding diesel engine liquid injectors. The fuel pressure increase by the heating of the fuel, and its subsequent thermal expansion, is substantial and varies as a function of the amount of fuel being injected with each valve opening. At the lower levels of flow corresponding to light load, the pressure rise due to heating thermal expansion is the lowest; when high fuel flow is demanded for heavy load to the engine, the heating expansion pressure rise is highest corresponding to the need for high pressures to distribute the fuel more widely in the combustion space.

Fuel heating is accomplished by the immersion of the fuel in the electrical resistance heating coil 18 surrounding the fuel injection delivery valve 16. Sufficient current is supplied to heat the fuel to a value higher than the auto ignition temperature of the fuel. Different fuels have different values of temperature required, with petroleum fuels being much lower than the alcohol fuels. One temperature selection will suffice for both, but if desired the current flow can be adjusted to change the maximum temperature to correspond with the value required for the fuel being used. The single value temperature setting can allow the functioning of both petroleum and alcohol fuels interchangeably without regulation or manual selection. Fuel of any octane or cetane number can work equally well.

A very close clearance is established between the injection delivery valve stem 16 and the guide hole 26 in the central valve housing. The small clearance created prevents any significant leakage flow and the loss of pressure built up by the expansion of the heated fuel in the chamber 14. Injection of fuel is metered by the solenoid valve 30 and a control computer (not shown) which sends a timed operating signal voltage to it. The controlled switching of the voltage and current to energize the solenoid causes the armature 32 to lift poppet valve 28 attached to it in opposition to the spring force of return spring 34 holding it in its seated position. With the valve off of its seat, the pressure on the enlarged diameter end 36 of delivery valve 16 is reduced to a low pressure existing in the fuel return passage 12; that is, the fuel pressure acting on the enlarged diameter end 36 of the delivery valve 16 is suddenly reduced as a result of the exposure of the fuel at that surface to the lowered pressure by way of passageways 45, 46, 47 and 48 to the fuel return passage 12. Since the pressure is suddenly reduced, the higher pressure resulting from the pressure equalization orifice 39 forces the delivery valve 16 out of contact with its valve seat 24 and permits escape of fuel through the orifice 22. Upon deenergization of the solenoid 30, the solenoid armature 32 returns to the position shown in the figure and the solenoid operated valve 28 returns to its seat to thus cut off the lower pressure to the end 36 of the delivery valve. The pressure on the enlarged end 36 is thus returned to the same pressure as that existing in the pressure equalization orifice 39 and the return spring 42 closes the delivery valve 16.

The use of hydraulic forces to actuate the injection valve permits rapid actuation and high closing spring forces for good seating/sealing of the valve; further, this technique also permits the use of smaller solenoids which can have a faster operating response time and can minimize the bulk and weight of a more powerful and larger solenoid.

The very high temperature of the heated fuel is maintained, and the loss of heat from the fuel is prohibited through the utilization of a thermal isolation space 17 surrounding the chamber 14. This space or air gap is located adjacent to the outside diameter of the chamber 14 to thus effectively prevent heat loss to the possibly cooler surfaces of the mounting thread 13 and supporting engine or combustion chamber parts.

Electrical activation of the solenoid coil is arranged to minimize energy loss; activation of the solenoid current is thus normally on for only a few milliseconds for each injection of the fuel. Under normal circumstances the fuel heater resistance coil 18 is turned on continuously. The design selected for description is self-regulating with a constant voltage supply and a resistance metal element forming the resistance coil that exhibits a resistance change with temperature that rises with the temperature so that the desired temperature is maintained when the fuel in the chamber 14 alternately warms and cools as the system operates. In applications where the cyclic operating rate is slow, it may be possible to turn the fuel resistance heater element on and off with the time that it is on minimized.

In the conventionally known spark ignition (Otto) or compression ignition (Diesel) engine the timing of electrical current energy to be supplied to the subject fuel injector is similar to that now common in solenoid operated injectors for production engines of that type. The only additional requirement for operation of the subject fuel injector is the need to supply a current to the resistance electrical heater to heat the fuel. This is accomplished by simple circuitry to turn the resistance heater current on along with the normal power supply used to activate the computer used to switch the current to the solenoid. At shut down of the device to avoid leaving the injector full of hot high pressure fuel it will be best to cut off heating electrical current just prior to the last injection, thus leaving a relatively cool fuel charge which will cool to low pressure and temperature more rapidly following stopping of the device.

When more than one injector is used in an engine it is important that the injectors deliver equal quantities of fuel. Close control of dimensions of the critical parts is the primary method of matching individual injectors. In special cases where extreme accuracy is required other means can be employed such as the use of trimming resistors, and variations in orifices, spring loads, etc.

Mounting and installation of the subject fuel injector will follow conventional practice. The injector can be mounted into a threaded opening, or clamped as is common for spark plugs or diesel fuel injectors. The physical size of the injector is close to that of an automobile spark plug. The length is very nearly the same with its diameter slightly larger at the solenoid end. Optional use of two injectors in aircraft engines can be made to conform to existing practice. Two injectors can also be installed with one firing a non-heated charge, or a charge heated to a temperature below the hypergolic ignition temperature, early in the operating cycle to increase the fuel charge in the cylinder, a process sometimes called fumigation. This use will allow increased power to be developed in the engine by increasing the maximum equivalence ratio of fuel that can be burned. The injector can be fired intermittently during idle to reduce fuel consumption. The injector can be turned off to reduce fuel consumption during deceleration. To increase the retarding effect of the engine the timing of the injection can be shifted to a much earlier time (crank angle) in the reciprocating engine to produce negative work as a power braking effect. Such a technique is valuable for automobiles and trucks when descending mountain grades. The fuel supply pumping requirements for the injector are for a nominal 1–2000 psi, with the return pressure at near atmospheric conditions.

Cold starting ability of engines is enhanced by the subject fuel injector. Immediate ignition of the fuel is available when the heated fuel is injected into the combustion space at any prevailing ambient temperature, thus insuring quick starting in arctic winter climates.

After-burners applied to jet aircraft can also be fitted with the subject fuel injector. The subject fuel injector can simplify the after-burner design by the elimination of the usual flame holders in the duct.

Engines which can use the subject liquid pump as a hot fuel injector in the future will be best described as "Hot Fuel Injected Engines" not as Diesel, Brayton, Otto, or Rankine because the differences which have distinguished them are diminished. All such engines will function thermodynamically under the cycle described by Carnot. When heated fuel is discharged into the combustion space of the positive displacement engines currently described as Diesel or Otto the differences fade to one of relative values of compression ratio which produces differences in internal temperature of the compressed air within the cylinder. The Diesel normally has operated with a higher compression ratio than the Otto or spark ignition engine. With hot fuel injection both engines can function over much wider differences in compression temperature/compression ratio overlapping each other and thus in reality the differences disappear and they will function in the same manner.

In the Rankine cycle, combustion of the fuel in the combustion chamber can be arranged such that partial recirculation of hot combustion products to heat the fuel to be burned is unnecessary to initiate combustion. The introduction of heated fuel into the inflowing stream of fresh air for combustion by use of the hot fuel injector simplifies the combustion chamber by eliminating the need for recirculation of combustion products to ignite the fuel.

In the Brayton cycle (gas turbine) engine a similar situation exists in that the combustion chamber can be simplified by eliminating the need for recirculation of hot gas to the point of fuel insertion because the hot fuel will ignite without recirculation as is necessary in conventional gas turbine engine combustion chambers. A further advantage of the hot fuel injector in the gas turbine is in the potential to achieve pressure wave combustion by intermittent injection of the fuel with the hot fuel injector. Such intermittent injection of fuel when operated with a tuned acoustic pressure wave in a duct or with a mechanically operated valve or check valve in a duct will permit higher power and thermal efficiency to be obtained from the gas turbine engine as it is currently known. The potential for use of the wave phenomenon has been investigated but never reduced to quantity production, perhaps largely due to the unavailability of a combustion process such as the use of the hot fuel injector as described here.

The conception of this hot fuel injector addresses one of the major obstacles encountered by prior investigators of similar concepts of hot fuel injection by accounting for the basic characteristics of the fuel. Those characteristics are the tendencies of the fuel to form carbonaceous deposits and they are accommodated in design by selection of appropriate materials, and the specification of time/temperature conditions to be achieved. The use of materials, such as copper, known to initiate formation of gums and deposits in fuels are avoided. Gum and deposit formation is largely caused by exposure of the fuel to relatively long times (minutes to hours) at high temperatures. This conception of an injector avoids exposing the fuel to high temperature for extensive periods of time by quickly heating the fuel just prior to injection and then only for a few milliseconds. A further conceptual characteristic of the injector is to flow the heated fuel into and out of the heated space at high velocity, a functional characteristic which also serves to inhibit the formation of gums and adherent deposits within the injector chambers. Fuel supplies will be specified and formulated to have oxygen and microscopic catalytic metallic contaminants removed, thus providing fuel of proper purity for long term operation.

The means and method described for opening and closing the delivery valve provides a convenient means for integration of the system into presently available and easily developed electronic control systems. It may also be noted that in some instances the liquid pump of the present invention when used as a fuel injector may encounter substantial space constraints. That is, in many engine compartments little space is available which necessitates reducing the size of the injector housing. It is possible to save space without departing from the described concept by positioning an actuating mechanism to command the delivery valve to open at a location remote from the housing. For example, a solenoid could be positioned remote from the fuel injector that could be utilized to operate a valve, also positioned remote from the fuel injector to drop the fuel pressure within the housing at one end of the delivery valve to result in the opening of the valve. Such mechanism need not be located within the housing if a reduction in the size of the housing is required.

I claim:

1. A method for injecting liquid fuel into a combustion space comprising the steps of:
    (a) passing said fuel through a first into a pressurizing chamber;
    (b) closing said first passageway to confine said fuel in said chamber;
    (c) heating said fuel in said chamber to a temperature higher than the fuel's auto ignition temperature to thereby thermally expand said liquid and increase its pressure without vaporization to permit hypergolic ignition of said fuel when injected into said combustion space;
    (d) discharging the pressurized fuel from said chamber through a second passageway into said combustion space to create hypergolic combustion;
    (e) closing said second passageway after the required amount of fuel has been discharged; and
    (f) repeating steps through.

2. A thermal pump for injecting liquid fuel into a combustion space comprising:
    (a) a housing;
    (b) a fuel supply passage within said housing for conducting fuel at a supply pressure;
    (c) a pressurizing chamber within said housing connected to said supply passage;
    (d) heating means for heating fuel in said chamber to increase its temperature, above the fuel's auto ignition temperature, to thermally expand said fuel and to increase its pressure above said supply pressure without vaporizing said fuel;
    (e) an outlet orifice in said housing connected to said pressurizing chamber;
    (f) means for opening said supply passage to admit fuel into said chamber and closing said supply passage to prevent escape of fuel from said chamber through said passage; and
    (g) means for closing said outlet orifice to permit pressurizing of fuel in said chamber to a pressure above the fuel pressure in said supply passage and opening said outlet orifice to discharge pressurized fuel from said chamber into said combustion space to provide hypergolic ignition.

3. The combination set forth in claim 2 wherein said means for opening and closing said outlet passage is an outlet valve spring biased to a closed position and a solenoid for opening said valve.

4. The combination set forth in claims 2 or 3 wherein said means for opening and closing said supply passage is a spring biased check valve.

5. The combination set forth in claims 2 or 3 wherein said heating means is positioned in said chamber.

6. The combination set forth in claim 3 wherein said outlet valve is spring biased to a closed position and includes an enlarged diameter end thereof forming a piston having supply fuel pressure acting on both sides thereof; and wherein the means for opening said outlet valve includes a solenoid that, when energized, lowers the pressure on one side of said piston to thereby force the piston against said spring bias and open said outlet valve.

* * * * *